(12) United States Patent  
Niedecker

(10) Patent No.: US 9,187,306 B2  
(45) Date of Patent: Nov. 17, 2015

(54) CASING BRAKE ASSEMBLY

(71) Applicant: Poly-clip System GmbH & Co. KG, Hattersheim (DE)

(72) Inventor: Frank Niedecker, Porza (CH)

(73) Assignee: Poly-clip System GmbH & Co. KG, Hattersheim (DE)

(*) Notice: Subject to any disclaimer, the term of this patent is extended or adjusted under 35 U.S.C. 154(b) by 75 days.

(21) Appl. No.: 14/044,377

(22) Filed: Oct. 2, 2013

(65) Prior Publication Data

US 2014/0102589 A1    Apr. 17, 2014

(30) Foreign Application Priority Data

Oct. 2, 2012    (EP) .................................... 12187026

(51) Int. Cl.
  *A22C 11/00*    (2006.01)
  *B67C 3/26*    (2006.01)
  *A22C 11/02*    (2006.01)

(52) U.S. Cl.
  CPC ................ *B67C 3/26* (2013.01); *A22C 11/0209* (2013.01); *A22C 11/0263* (2013.01)

(58) Field of Classification Search
  CPC .. A22C 11/00; A22C 11/006; A22C 11/0263; A22C 2011/101; A22C 11/107
  USPC ............ 452/21–26, 30–32, 35–37, 46–48, 51
  See application file for complete search history.

(56) References Cited

U.S. PATENT DOCUMENTS

| | | | |
|---|---|---|---|
| 5,074,386 A | 12/1991 | Evans | |
| 5,503,594 A * | 4/1996 | Karubian et al. | ............. 452/173 |
| 5,607,349 A * | 3/1997 | Karubian et al. | ............. 452/173 |
| 2012/0175015 A1 | 7/2012 | Jens | |

FOREIGN PATENT DOCUMENTS

EP    1428437 A1    6/2004

* cited by examiner

*Primary Examiner* — Richard Price, Jr.
(74) *Attorney, Agent, or Firm* — Fitch, Even, Tabin & Flannery LLP

(57) ABSTRACT

The present invention relates to a casing brake assembly for applying a frictional force to a tubular or bag-shaped packaging casing being arranged on a filling tube of an apparatus for filling and closing said tubular or bag-shaped packaging casing, like a clipping machine, for limiting the movement of said tubular or bag-shaped packaging casing at least while being filled, the filling tube has a longitudinal axis. The casing brake assembly comprises at least one braking body which is reversibly movable between a release position, in which the braking body is at least partially moved away from the filling tube and a brake position in which the braking body at least approximately completely surrounds the filling tube, and which comprises at least two free ends. The casing brake assembly further comprises at least two support elements for supporting and reversibly moving the at least one braking body.

19 Claims, 14 Drawing Sheets

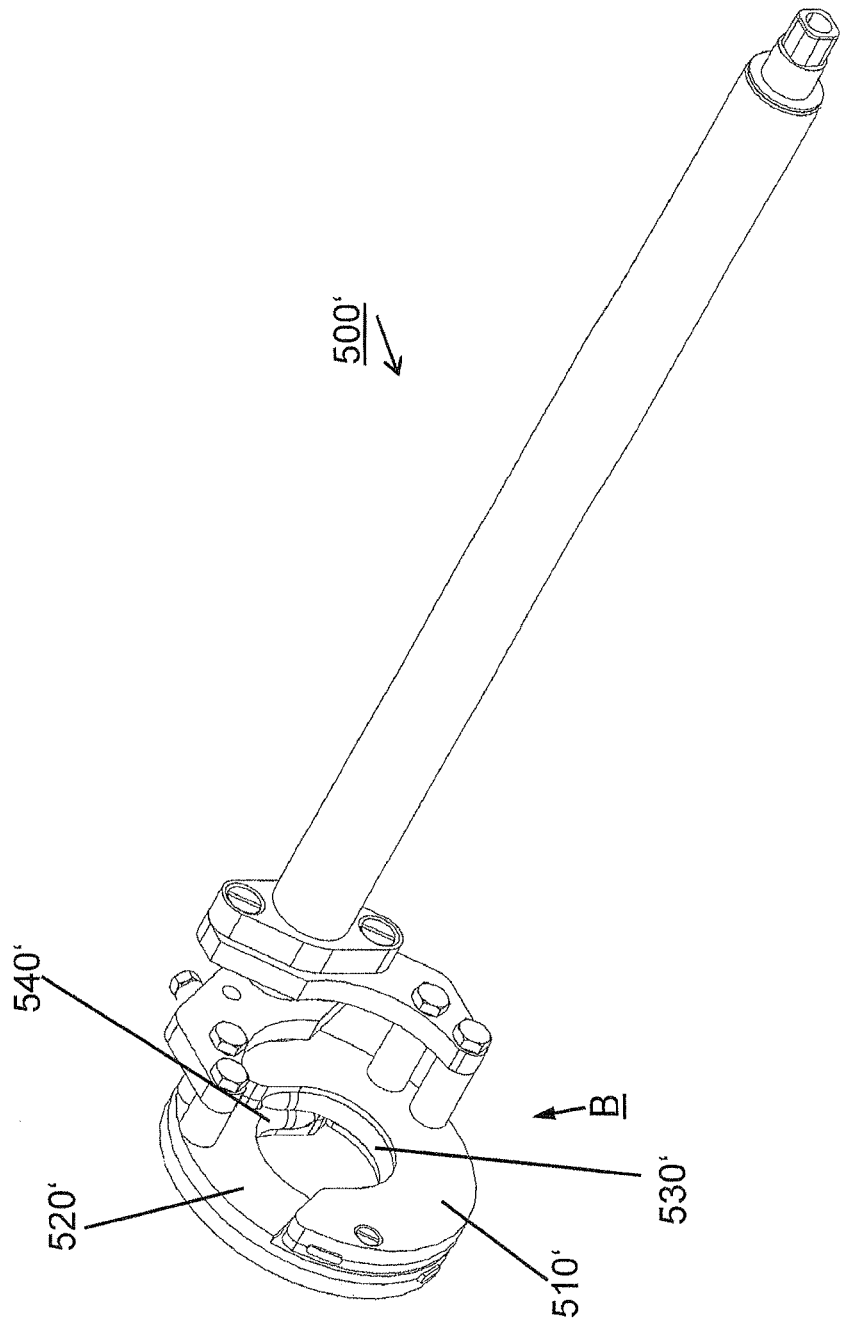

CASING BRAKE ASSEMBLY

CROSS REFERENCE TO RELATED APPLICATIONS

This application claims priority to, and the benefit of, European Patent Application No. 12 187 026.5-1655 filed Oct. 2, 2012 with the European Patent Office, which is hereby incorporated by reference.

FIELD OF THE INVENTION

The present invention relates to a casing brake assembly.

BACKGROUND OF THE INVENTION

In practice, it is known that, for example in the production of sausage-shaped products, like sausages, filling material is fed by a filling machine through a filling tube of a clipping machine into a tubular packaging casing which is stored on the filling tube and which is closed at its front end, i.e. the end pointing in the feeding direction of the filling material by a closure means, like a closure clip. The tubular packaging casing is pulled-off from the filling tube while being filled by the feeding pressure. At least during the filling process, a casing brake applies a frictional force to the tubular packaging casing while being pulled-off from the filling tube, in order to control the pull-off speed and to ensure an at least approximately constant filling degree. After a predetermined volume of filling material has been filled into said tubular packaging casing, a displacer arrangement with a first and a second displacer unit which can each be formed by a pair of reversibly moveable displacement elements, a plait-like portion of the tubular packaging casing is formed. The clipping machine then places and closes at least one closure clip at the plait-like portion forming the rear end of the sausage shaped product, i.e. the end pointing against the feeding direction by respective closing tools which are reversibly movable towards the plait-like portion.

From EP patent application 1 428 437, a clipping machine is known including a casing brake assembly. The casing brake assembly is attached to a frame element of the clipping machine. The casing brake itself is of a closed circular construction and has a closed circular lip which surrounds completely the filling tube. A fork-shaped holding element including two rakes, accommodates and supports the casing brake in its operation position. For removing the casing brake from the clipping machine, the casing brake assembly has to be shifted from the filling tube by moving the casing brake assembly along the filling tube in the filling direction. Thereafter, the casing brake may be removed out of the fork-shaped holder in a direction vertically to the longitudinal axis of the filling tube.

A further known casing brake assembly is disclosed in EP patent application 1 987 719. This casing brake assembly includes two brake rings. A first brake ring is mounted on the filling tube and has a brake surface arranged at its outer circumference. A second brake ring coaxially surrounds the first brake ring on the filling tube. The outer or second brake ring has a circular lip acting on the inner or first brake ring for applying a frictional force on the tubular packaging casing material guided between the two brake rings. For adjusting the brake force, the outer brake ring is shifted along the filling tube relative to the inner, brake ring. For removing at least the outer brake ring from the filling tube, e.g. in order to refill tubular packaging casing material to the filling tube, the outer brake ring has to be shifted in the filling direction and has to be removed from the filling tube.

For these known assemblies, additional space has to be provided in the region of the outflow end of the filling tube for removing the casing brake assembly or parts therefrom, respectively, to provide the required space, the filling tube and/or the clipping machine which is positioned downstream the filling tube, have to be arranged such that it or they can be reversibly moved in the filling direction, which requires an additional effort in their construction and additional space at the installation site.

Thus, it is an object of the present invention to provide a casing brake assembly which overcomes the above mentioned drawbacks and which allows a simplified and compact construction of a clipping machine.

SUMMARY OF THE INVENTION

According to the present invention, there is provided a casing brake assembly for applying a frictional force to a tubular or bag-shaped packaging casing being arranged on a filling tube of an apparatus for filling and closing said tubular or bag-shaped packaging casing, like a clipping machine, for limiting the movement of said tubular or bag-shaped packaging casing at least while being filled, the filling tube comprises a longitudinal axis. The casing brake assembly comprises at least one braking and sealing body which is reversibly movable between a release position, in which the braking and sealing body is at least partially moved away from the filing tube, and a brake position in which the braking and sealing body at least approximately completely surrounds the filling tube, and which comprises at least two free ends. The casing brake assembly further comprises at least two support elements for supporting and reversibly moving the at least one braking and sealing body between the release position and the brake position in a plane at least approximately vertically to the longitudinal axis of the filling tube.

This inventive construction allows the braking and sealing body to be adapted to be removed at least partially from the filling tube in a direction vertical to the longitudinal axis if the filling tube, without being shifted parallel to the longitudinal axis of the filling tube. Thereby, no additional space is required in the region of the outflow end of the filling tube for removing the casing brake assembly or party of it from the filling tube.

The braking and sealing body may have any suitable construction. It may be formed only by a single braking and sealing element. This single braking and sealing element surrounds, when in the brake position, at least approximately completely the filling tube. In order to be able to be removed from the filling tube in a direction at least approximately vertical to the longitudinal axis of the filling tube, the single braking and sealing element has two free ends which can reversibly be moved towards to each other to reach the brake position of the single braking and sealing element and can reversibly be moved from each other to reach the release position in which the filling tube, for example, can be moved in a horizontal plane including its longitudinal axis.

In order to be able to provide an even braking force and/or sealing around the filling tube, it is of further advantage when the single braking and sealing element has two free ends which are adapted to be moved in two planes extending at least approximately parallel to each other and vertically to the longitudinal axis of the filling tube, and which are adapted to overlap each other in a circumferential direction of the filling tube and to lie closely to each other in the brake position. Thereby, the braking and sealing element can have the shape of a ring with free ends which face in the circumferential direction. It is also possible, that the free ends are bent such from the single braking and sealing element that they are facing in a direction away from the annular defined by the single braking and sealing element. This construction allows an easier attachment of the free ends to the support elements and/or to driving elements for moving the free ends of the single braking and sealing element. Moreover, for allowing a movement of that single braking and sealing element from the release position into the brake position, it is of advantage if the single braking and sealing element is only fixed by a portion of it to a holding device which can be formed by the support elements or other elements of the braking assembly wherein the respective fixed portion is provided opposite to the free ends of the single braking and sealing elements. With this construction, it is possible to move all other portions or sections of the single braking and sealing element for getting a tight closing around the filling tube by the single braking and sealing element.

The braking and sealing body may also be formed by more than one, e.g. at least two braking and sealing elements. In case that more than one braking and sealing element is provided, a more uniform braking force and/or sealing may be applied at the circumference of the filling tube. Otherwise, in case of only one braking and sealing element, the sealing between the braking and sealing element and the filling tube is improved since only one overlapping region in the vicinity to the two free ends of the braking and sealing element is necessary to form a closed ring-shaped structure in the brake position.

In a further preferred embodiment of the casing brake assembly according to the present invention, the single braking and sealing element or at least one of the two or more braking and sealing elements are replaceable mounted to the support elements. The replacement of the braking and sealing elements allows an adaption of the casing brake assembly to different casing material, like artificial or natural materials which require different brake forces. Alternatively, present braking and sealing elements may be replaced by braking and sealing elements of a different size in adaption to filling tubes and/or packaging casing materials, which have different diameters.

According to a preferred embodiment of the inventive casing brake assembly, the single braking and sealing element or at least one of the two or more braking and sealing elements have a brake surface which may have any suitable form. The brake surfaces of the braking and sealing elements may comprise a resilient brake lip. Such a resilient lip may balance variations in the thickness of the packaging casing material, e.g. in natural casing materials. Naturally, each conically shaped brake surface may be sufficient for providing a frictional force to the tubular or bag-shaped packaging casing. Alternatively, the single braking and sealing element or at least one of the two or more braking and sealing elements may be formed by string-shaped resilient elements. Said string-shaped resilient elements may adapt the outer shape of filling tubes of various diameters.

In order to adapt the braking and sealing elements to the size of the filling tube and/or the kind of casing material, in a further advantageous embodiment of the inventive casing brake assembly, the single braking and sealing element or at least one of the two or more braking and sealing elements may be of an at least partially approximately tubular inflatable construction.

Additionally to the adaption of the single braking and sealing element or at least one of the two or more braking and sealing elements to different sizes of the filling tubes and/or different kinds of packaging casing material, the brake force of the single braking and sealing element or at least one of the two or more braking and sealing elements, acting on the tubular or bag-shaped packaging casing, is adjustable by the degree of inflation of the second braking and sealing elements.

For reversibly moving the single braking and sealing element or its free ends and its sections following the free ends, or at least one of the two or more braking and sealing elements between the release position and the brake position in a plane at least approximately vertically to the longitudinally axis of the filling tube, the support elements are pivotably arranged levers. Alternatively, the support elements are linearly drivable, for reversibly linearly shifting at least one of the two or more braking and sealing elements towards the filling tube or for moving the free ends of the single braking and sealing element.

For driving the support elements, separate drives may be provided, wherein each support can have a separate drive, or the at least two support elements have a common drive. Naturally, the movement of the support elements may also be derived from a drive present in the clipping machine, like the drive for the displacer elements or the clipping tools.

For applying a frictional force to the tubular or bag-shaped packaging casing, which is at least approximately constant circumferentially around the filling tube, two or more braking and sealing elements are aligned to each other in a manner to be diametrically arranged around the filling tube, at least in their brake position.

Two braking and sealing elements which approximately completely surround the filling tube in their brake position, may be sufficiently to apply a respective frictional force to the tubular or bag-shaped packaging casing. Alternatively, in case that more than two braking and sealing elements are provided, these more than two braking and sealing elements are preferably arranged in regular intervals around the filling tube in the circumferential direction of the filling tube, at least in their brake position.

Advantageously, a control unit is provided, which is adapted for controlling the drives of the at least two or at least first or second support elements. Said control unit thereby not only may control the movement of the at least first and second support elements between the release position and the brake position, but also the adjustment of a frictional force due to a radial movement of the at least one of the two or more braking and sealing elements.

It has to be understood, that in case of braking and sealing elements which are at least partially approximately tubular inflatable, the control unit may also control the adjustment of the frictional force by controlling the inflation of the at least one of two or more braking and sealing elements.

In conjunction with the present invention, the term "radially" with regard to the reversible movement of the support elements towards the filling tube has to be understood as not being limited to a linear movement, but may also describe any other form of moving paths, like a curve or a trajectory having a partially circular shape. In this case, it is essentially, that the support elements are moved in a plane which is at least approximately vertically aligned to the longitudinal axis of the filling tube.

In the operation, the tubular casing material is pulled-off from the filling tube by the pressure of the filling material supplied via the filling tube into the tubular packaging casing material which is closed at its front end by a closure clip.

For preventing the tubular packaging casing material from being uncontrolled pulled-off from the filling tube, and for preventing a backflow of filling material into the space between the filling tube and the tubular packaging casing material, a casing brake assembly is provided having a brake body which includes at least one braking and sealing element.

The braking and sealing element surrounds the tubular packaging casing material on the filling tube and applies a frictional or braking force and/or a sealing to the tubular casing material.

To ensure an approximately constant braking force of a selected value and/or a respective sealing, said braking and/or sealing force may be adjusted, e.g. by selecting a respective material for the braking and sealing elements or by providing inflatable braking elements, as described above.

In order to refill the tubular packaging casing material to the filling tube, at the beginning of the production process or the tubular packaging casing material present on the filling tube has run empty, the end of the filling tube facing the clipping machine has to be pivoted out of the clipping machine.

Conventionally, a casing brake assembly positioned on the filling tube, has to be shifted in feeding direction to be removed from the filling tube. This requires a gap or space between the clipping machine and the end of the filling tube facing the clipping machine, which is sufficient to accommodate the casing brake assembly, to allow the filling tube to be pivoted out of the clipping machine.

According to the embodiments of the casing brake assembly according to the present invention, the one or more braking and sealing elements of the inventive casing brake assembly can be moved reversibly in a plane vertically to the filling tube from the brake position into the release position. Thereby, the closed ring structure formed by the single braking and sealing element or by two or more braking and sealing elements in the brake position, is opened, at least in the front region of the filling tube. This enables the filling tube to be pivoted away from the casing brake assembly without shifting the casing brake assembly from the filling tube.

The essential idea of the present invention is to provide a casing brake assembly which includes one or more braking and sealing elements, which in the brake position at least approximately completely surround the filling tube to provide a frictional force to the casing material on the filling tube, and that the one or more braking and sealing elements are movable in a plane approximately vertically aligned to the filling tube into a release position, thereby opening the closed ring structure to enable the filling tube being pivoted out of the casing brake assembly.

Further advantages and preferred embodiments of the present invention will be described in the following together with the drawings listed below. The expressions "left", "right", "below" and "above" used in the following description, are referred to the drawings in an alignment such that the reference numbers and the notation of the Figs. used can be read in normal orientation.

BRIEF DESCRIPTION OF DRAWINGS

FIG. 9a: is a schematic and perspective view to a further embodiment of the casing brake assembly according to the present invention similar to said of FIG. 9 with the braking and sealing body in the brake position;

DETAILED DESCRIPTION

Figure 1:
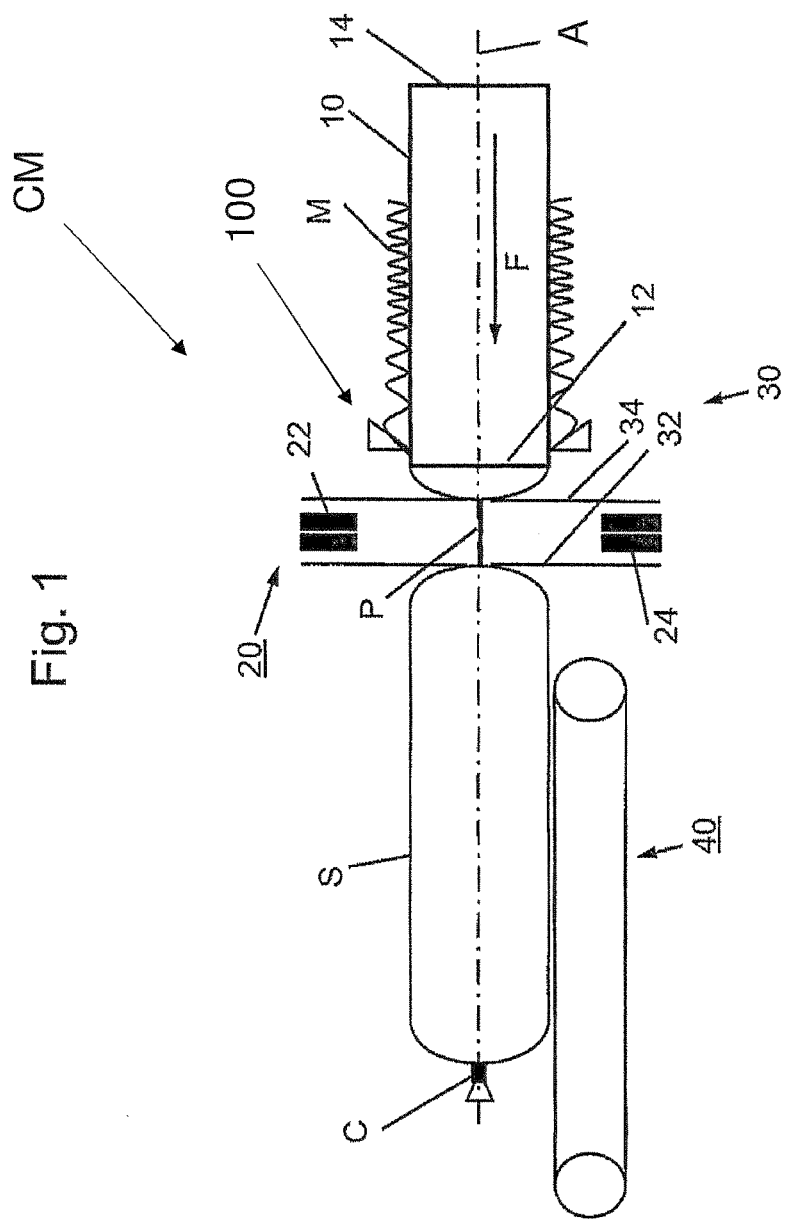
FIG. 1: is a schematic view to a clipping machine including a casing brake assembly according to the present invention.

A clipping machine CM for producing sausage-shaped products S shown in FIG. 1, comprises as main components a circular cylindrical filling tube 10 having a longitudinally extending central axis A and being made of a suitable material, like stainless steel, wherein a tubular packaging casing M made of a thin sheet material is stored on the filling tube 10, a clipping device 20, and gathering means 30 for gathering the filled tubular packaging casing M and for forming a plait-like portion thereto are arranged downstream filling tube 10. Clipping device 20 is provided for closing the filled tubular packaging casing M by applying a closure means, like a closure clip C, to said plait-like portion P.

As it can be inferred from FIG. 1, horizontally arranged filling tube 10 has a left end 12 facing clipping device 20 and a right end 14 coupled to a filler arrangement (not shown in FIG. 1) including a pump for feeding filling material through filling tube 10 in a feeding direction F into tabular packaging casing M closed on its end facing in the filling direction F by a closure clip C.

Positioned immediately downstream left end 12 of filling tube 10, clipping device 20 is arranged and coaxially aligned to filling tube 10. Clipping device 20 comprises a first and a second pair of clipping tools 22, 24, wherein each pair of clipping tools 22, 24 includes a punch and a die. Gathering means 30 includes a first displacer unit 32 and a second displacer unit 34, wherein first displacer unit 32 is positioned downstream second displacer unit 34. First and a second pair of clipping tools 22, 24 of clipping device 20 are positioned between first and second displacer units 32, 34.

Furthermore, for discharging sausage-shaped product S just produced from clipping machine CM, downstream clipping device 20, a transportation device or belt conveyor 40 is arranged, comprising a conveyor belt and guide rollers. Transportation direction T of belt conveyor 40 coincides with feeding direction F. The height of the upper conveyor belt section of belt conveyor 40 is aligned to the lower side of the sausage shaped product S to be produced and discharged from clipping machine CM.

Clipping machine CM further comprises an inventive casing brake assembly 100, which is arranged on filling tube 10 in the vicinity of left end 12 of the filling tube 10 in order to control the movement of tubular packaging casing M when pulled-off from filling tube 10 by the filling pressure. In FIG. 1, only the braking and sealing elements of casing brake assembly 100 are shown. The casing brake assembly 100 according to the present invention will be described in greater detail in conjunction with FIGS. 2 to 12.

Figure 2:
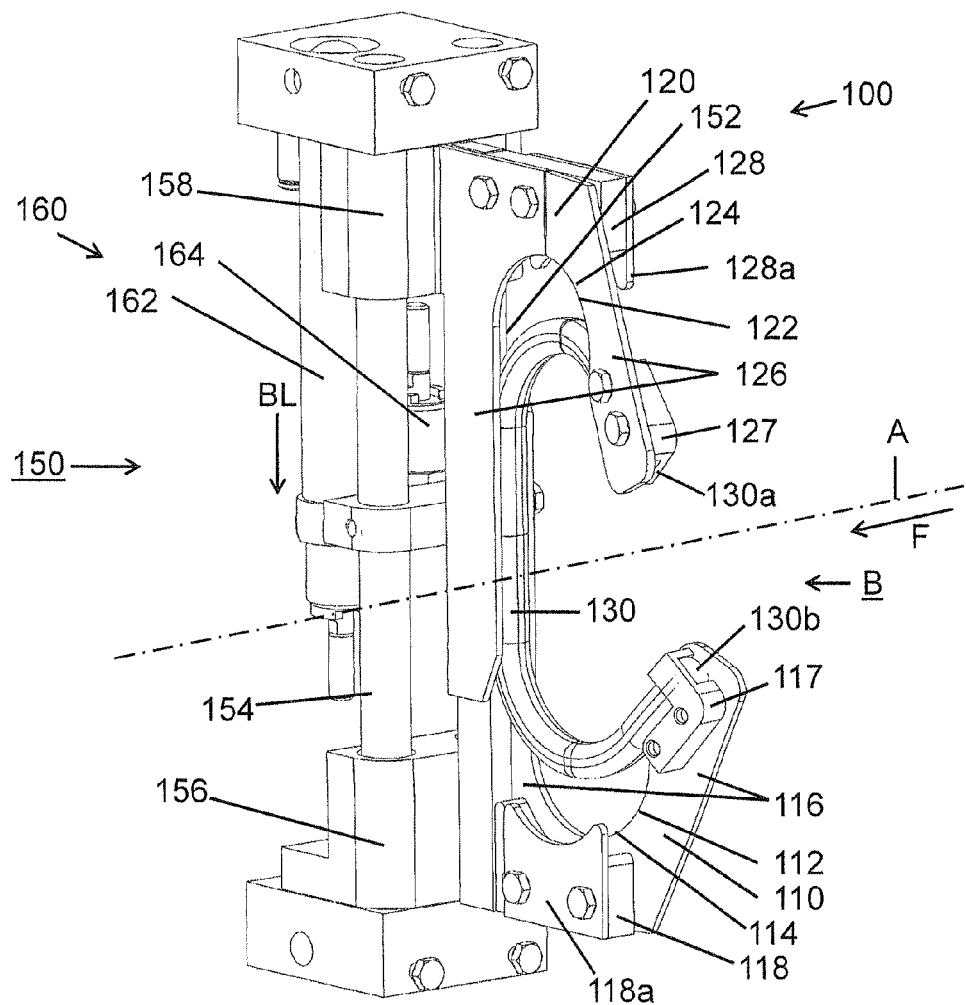
FIG. 2: is a schematic and perspective view to a first embodiment of the casing brake assembly according to the present invention, with the braking and sealing body in the release position.

FIG. 2 is a schematic and perspective view to a first embodiment of the casing brake assembly 100 according to the present invention.

Casing brake assembly 100 according to FIG. 2 comprises two support elements, a lower support element 110 and an upper support element 120 which are positioned diametrically below and above filling tube 10 (not shown in FIG. 2). Upper and lower support elements 110, 120 are formed by at least approximately vertically arranged plates which comprise approximately U-shaped cutouts 112, 122. Cutouts 112, 122 face towards filling tube 10. Support elements 110, 120 include approximately semicircular bottom portions 114, 124 and approximately vertically aligned leg-portions 116, 126. As it can be seen in FIG. 2, lower and upper support elements 110, 120 are arranged vertically and with a small axial distance in feeding direction F.

Casing brake assembly 100 comprises a braking and sealing body B in the form of a single string-shaped braking and sealing element 130 having a first free end 130a and a second free end 130b. String-shaped braking and sealing body B has a circular cross section and extends in a vertical plane between lower and upper support elements 110, 120. The distance between lower and upper support elements 110, 120 in feeding direction F is larger than the diameter of the cross-section of braking and sealing body B, approximately as twice as said diameter.

In the release position, as shown in FIG. 2, braking and sealing element 130 of braking and sealing body B has an approximately C-shaped contour with short sections in the region of the first and second free ends 130a, 130b, bent clockwise and counterclockwise, respectively, so as to face radially away from longitudinal axis A of filling tube 10. In the release position, the central region 130c of braking and sealing element 130 remains supported between the rear most legs 116, 126 of lower and upper support elements 110, 120.

Bent portions in the region of first and second free ends 130a, 130b are fixed to lower and upper support elements 110, 120, each by a clamping element 117, 127 which are mounted at the tip ends of front most leg-portions 116, 126 of lower and upper support elements 110, 120. Clamping elements 117, 127 are mounted to the side surfaces of lower and upper support elements 110, 120 facing each other such that clamping elements 117, 127 are positioned vertically between lower and upper support elements 110, 120.

As it further can be seen in FIG. 2, support blocks 118, 128 are mounted to lower and upper support elements 110, 120 in the region of their bottom portions 114, 124 and at the same side surface of lower and upper support elements 110, 120 as clamping elements 117, 127. Support blocks 118, 128 comprise guide plates 118a, 128a attached to the side surfaces of support blocks 118, 128 facing away from support elements 110, 120. Guide plates 118a, 128a extending from support blocks 118, 128 in a direction towards longitudinal axis A of filling tube 10 for guiding and supporting braking and sealing element 132 in the brake position as shown in FIG. 3.

Figure 3:
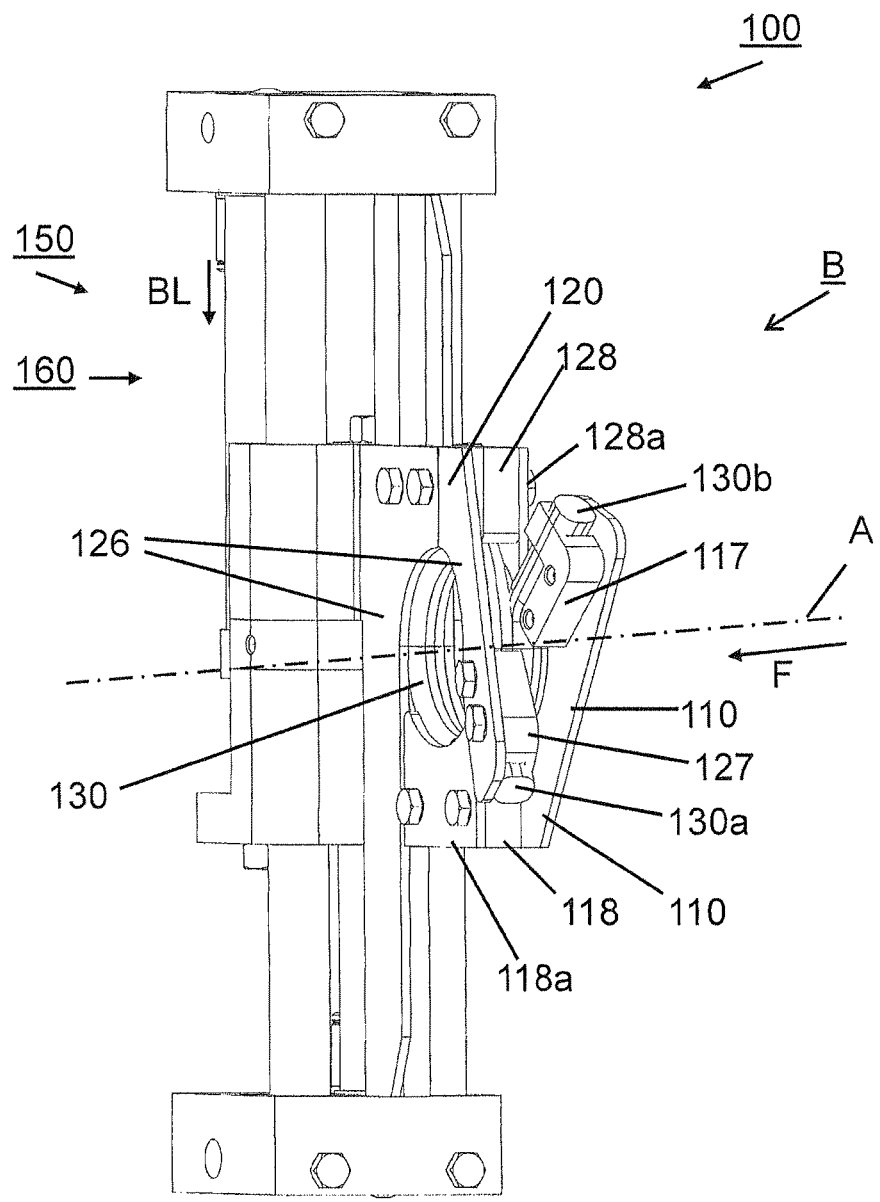
FIG. 3: is a schematic and perspective view to the casing brake assembly of FIG. 2, with the braking and sealing body in the brake position.

Casing brake assembly 100 further comprises guide means 150 for reversibly vertically guiding lower and upper support elements 110, 120 towards to and away from filling tube 10 between the release position as shown in FIG. 2 and the brake position shown in FIG. 3.

Guide means 150 include two vertically arranged guide posts 152, 154, a lower carriage 156 and an upper carriage 158. Carriages 156, 158 are slidable mounted to posts 152, 154. Drive means 160 in the form of piston/cylinder arrangements 162, 164 are coupled to carriages 156, 158 for driving carriages 156, 158 reversible along posts 152, 154 linearly in a brake direction BL. Alternatively to the embodiment described above, it is also possible that the lower and upper support elements 110, 120 can be pivoted around an axis extending parallel to longitudinal axis A or the feeding direction F and which can be arranged behind casing brake assembly 100.

FIG. 3 is a schematic and perspective view to casing brake assembly 100 of FIG. 2, with braking and sealing body B in the brake position.

In this position, support elements 110, 120 are shifted or moved to filling tube 10, whereby braking and sealing element 130 of braking and sealing body B forms a closed ring structure surrounding filling tube 10. Between filling tube 10 and the closed ring structure formed by braking and sealing element 130, an annular space is formed. Tubular casing material M, which is not shown in FIGS. 2 and 3 (and also in all other FIGS. 4 to 12), is guided through the annular space between braking and sealing element 130 and filling tube 10. In the brake position, braking and sealing element 130 applies a frictional force or brake force to tubular casing material M, due to the tension executed by lower and upper support elements 110, 120 to braking and sealing body B, when being shifted into the brake position.

As it further can be seen in FIG. 3, lower and upper support elements 110, 120 are arranged vertically and with an axial distance in feeding direction F. The axial distance between lower and upper support elements 110, 120, according to the embodiment of FIGS. 2 and 3, in the region of the rear most legs 116, 126 corresponds to diameter of braking and sealing element 132, which thereby is secured between the rear most legs 116, 126 and partially between bottom portions 114, 124 against movement in feeding direction F between lower and upper support elements 110, 120. The front most legs 116, 126 of support elements 110, 120 are bent away from each other in a manner that clamping elements 117, 127 may pass each other without disturbing with each other during the movement of lower and upper support elements 110, 120 into and out of the brake position. The distance between front most legs 116, 126 is selected to allow braking and sealing element 130 to form a closed ring around filling tube 10 with its overlapping ends positioned closed to each other, in order to form a tight seal around filling tube 10 and to provide an even braking force and/or sealing around the filling tube.

For applying a frictional force to tubular casing material M, braking and sealing body B is made of a suitable material, like metal or plastic, having elastic and/or biasing characteristics.

In adaption to different casing materials, braking and sealing body B may be replaceable mounted to support elements 110, 120. In case of sufficiently sized U-shaped cutouts 112, 122, braking and sealing body B may also be replaced by a braking and sealing body B of a different size, having a larger or smaller inner diameter, in adaption to packaging casing material M and/or a filling tube 10 of a respective larger or smaller diameter.

Braking and sealing body B has been described as being in the form of a string having a circular diameter. Alternative cross sections may be selected in order to an adaption to specific packaging casing materials. Braking and sealing body B may have an approximately flat inner surface or may comprise a brake lip on its inner surface.

Alternatively, braking and sealing body B may also be formed by an inflatable tubular element, which may be inflated at selected degrees to apply respective different braking and/or sealing forces to the packaging casing material on filling tube 10.

In the following, further embodiments of the present invention are disclosed. Thereby, the same reference numbers are used for identical or similar parts having the same functionality as the parts described in conjunction with FIGS. 2 and 3 above, wherein the reference numbers are incremented by 100 for each embodiment.

Figure 4:
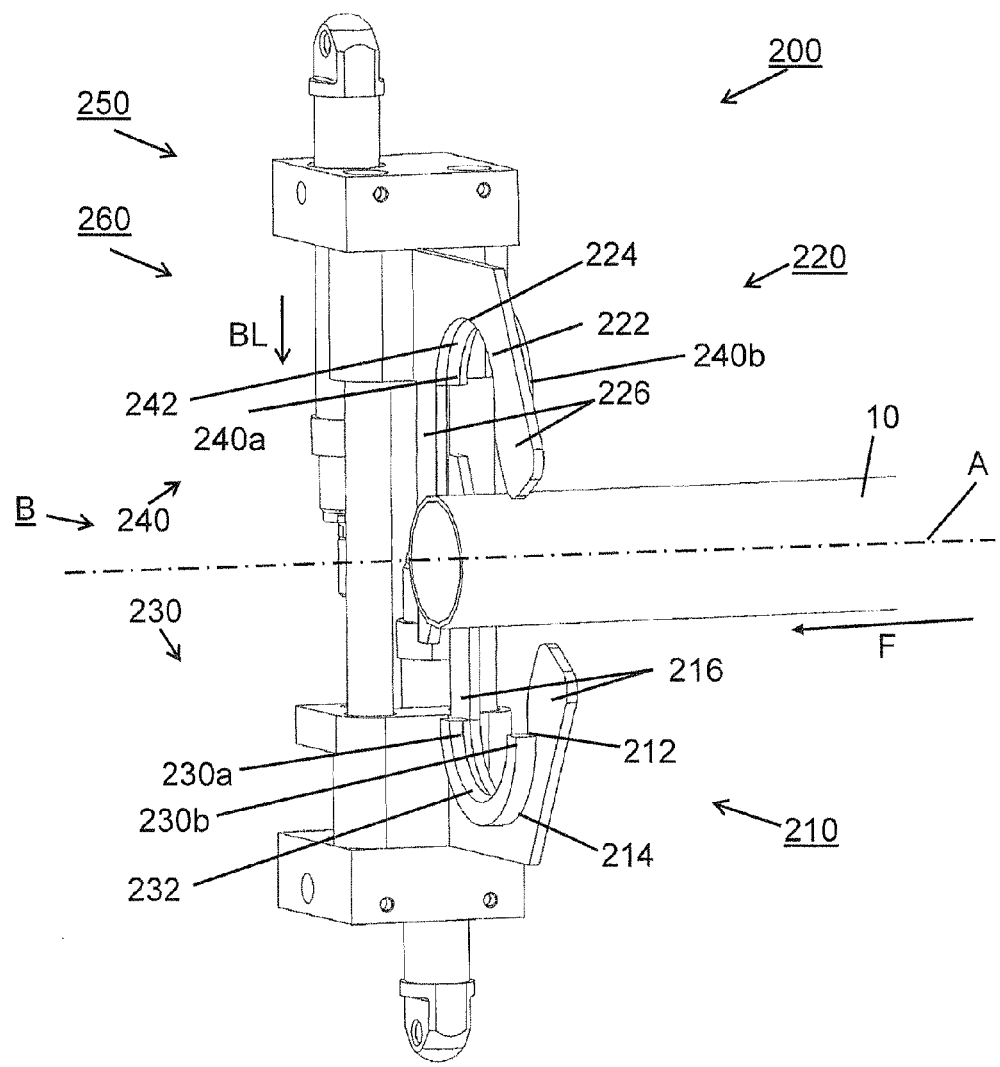
FIG. 4: is a schematic and perspective view to a second embodiment of the casing brake assembly according to the present invention, with the braking and sealing body in the release position.

FIG. 4 is a schematic and perspective view to a second embodiment of the casing brake assembly 200 according to the present invention.

Casing brake assembly 200 according to FIG. 4 comprises a lower support element 210 and an upper support element 220 which are positioned diametrically below and above filling tube 10. Upper and lower support elements 210, 220 are formed by at least approximately vertically arranged plates which comprise approximately U-shaped cutouts 212, 222. Cutouts 212, 222 are directed towards filling tube 10. Support elements 210, 220 include approximately semicircular bottom portions 214, 224 and leg portions 216, 226.

Braking and sealing body B of casing brake 200 is formed by two braking and sealing elements 230, 240. First braking and sealing element 230 is mounted to bottom portion 214 matching cutout 212 of lower support element 210, and second braking and sealing element 240 is mounted to bottom portion 224 matching cutout 222 of upper support element 220. First or lower braking and sealing element 230 and second or upper braking and sealing element 240 have an at least approximately semicircular shape with inner surfaces having an inner diameter which is slightly smaller than the inner diameter of cutouts 212, 222, and which is slightly larger the outer diameter of filling tube 10. The inner surfaces of lower and upper braking and sealing elements 230, 240 act as brake surfaces 232, 242.

Lower and upper braking and sealing elements 230, 240 of braking and sealing body B are mounted to side surfaces of lower and upper support elements 210, 220 in a manner that lower braking and sealing element 230 directs or faces from lower support element 210 in feeding direction F, whereas upper braking and sealing element 240 faces from upper support element 220 in the counter direction of feeding direction F. As it can be seen in FIG. 4, lower and upper support elements 210, 220 are arranged vertically and with an axial distance in feeding direction F. The axial distance between lower and upper support elements 210, 220 in feeding direction F is selected such that lower and upper braking and sealing elements 230, 240 are vertically aligned to each other.

Lower and upper braking and sealing elements 230, 240 have free ends 230a, 230b and 240a, 240b, which are directed towards each other. In the brake position, as shown in FIG. 5, free ends 230a, 230b of lower braking and sealing element 230 abut against free ends 240a, 240b of upper braking and sealing element 240, thereby forming a closed ring structure.

Figure 5:
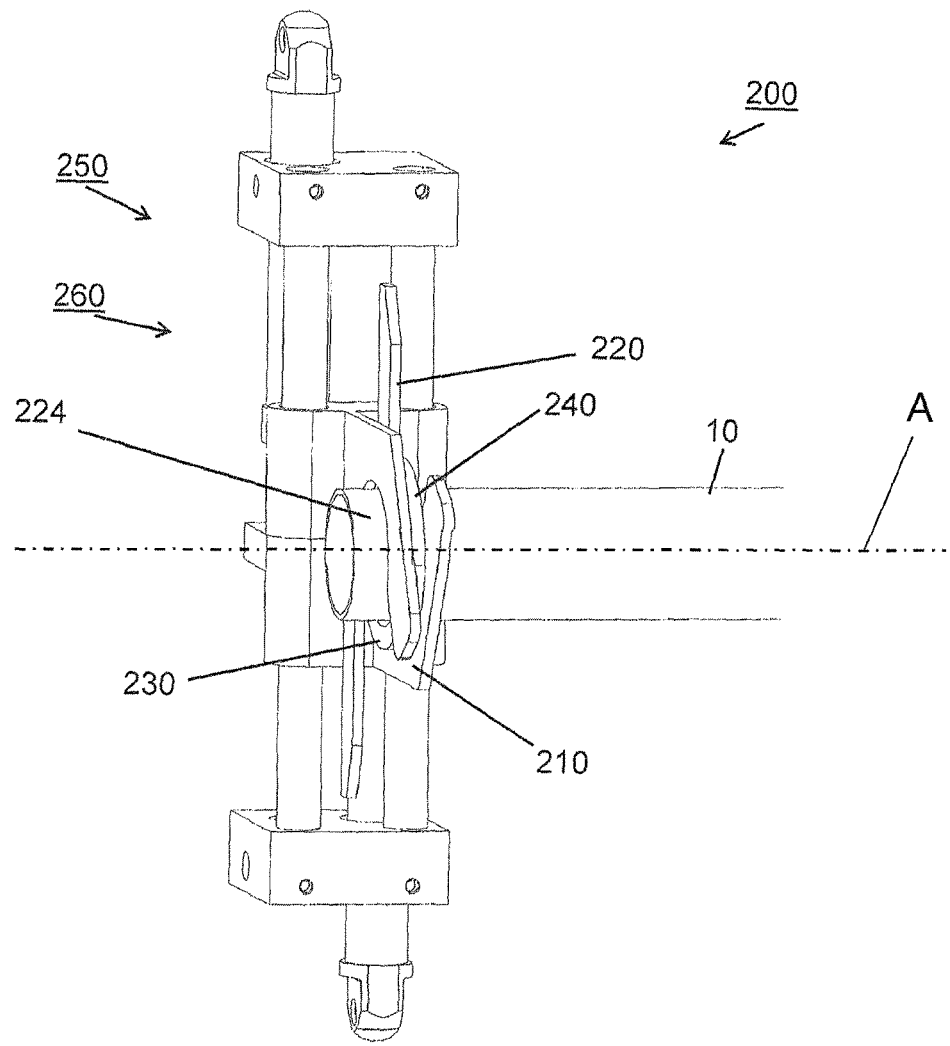
FIG. 5: is a schematic and perspective view to the casing brake assembly of FIG. 4, with the braking and sealing body in the brake position.

Casing brake assembly 200 further comprises guide means 250 for reversibly vertically guiding lower and upper support elements 210, 220 together with braking and sealing elements 230, 240 towards to and away from filling tube 10 between the release position as shown in FIG. 4, and the brake position shown in FIG. 5, in brake direction BL. Casing brake assembly 200 further comprises drive means 260 for reversibly driving support elements 210, 220 in brake direction BL. Guide means 250 and drive means 260 are of similar construction as guide means 150 and drive means 160 of casing brake assembly 100 of FIGS. 2 and 3, and thus, need not to be explained in detail.

FIG. 5 is a schematic and perspective view to the casing brake assembly 200 of FIG. 4, with the braking and sealing elements 230, 240 in the brake position.

In this position, support elements 210, 220 are shifted to filling tube 10, whereby semicircular braking and sealing elements 230, 240 form a closed ring structure surrounding filling tube 10. Between filling tube 10 and the closed ring structure formed by braking and sealing elements 230, 240, an annular space is formed. Tubular packaging casing material M is guided through the annular space between braking and sealing elements 230, 240 and filling tube 10. In the brake position, braking and sealing elements 230, 240 apply a frictional force or brake force to tubular packaging casing material M.

As it further can be seen in FIG. 5, lower and upper support elements 210, 220 are arranged vertically and with an axial distance in feeding direction F. The axial distance between lower and upper support elements 210, 220, according to the embodiment of FIGS. 4 and 5, corresponds to the axial length of braking and sealing elements 230, 240 of braking and sealing body B, in feeding direction F, which are accommodated between lower and upper support elements 210, 220.

As it further can be seen in FIG. 5, semicircular bottom portion 214, 224 of U-shaped cutouts 212, 222 completely surround filling tube 10, when seen in feeding direction F. The diameter of this ring-shape is slightly larger than the inner diameter of the ring structure formed by braking and sealing elements 230, 240. This enables braking and sealing elements 230, 240 yielding in radial direction, in case of resilient material, and prevents damaging tubular packaging casing material M when being pulled-off from filling tube 10.

For applying a frictional force to tubular casing material M, braking and sealing elements 230, 240 are made of a suitable material, like metal or plastic. In case of plastic material, braking and sealing elements 230, 240 may be made of a resilient material. Alternatively, braking and sealing elements 230, 240 of braking and sealing body B may also have a stiff body and comprise a resilient brake lip (not shown in FIG. 4 or 5).

In adaption to different casing materials, casing braking and sealing elements 230, 240 may be replaceable mounted to support elements 210, 220. In case of sufficiently sized U-shaped cutouts 212, 222, braking and sealing elements 230, 240 may also be replaced by braking and sealing elements of a different size, like having a larger or smaller inner diameter, in adaption to packaging casing material and/or filling tube 10 of a respective larger or smaller diameter.

Figure 6:
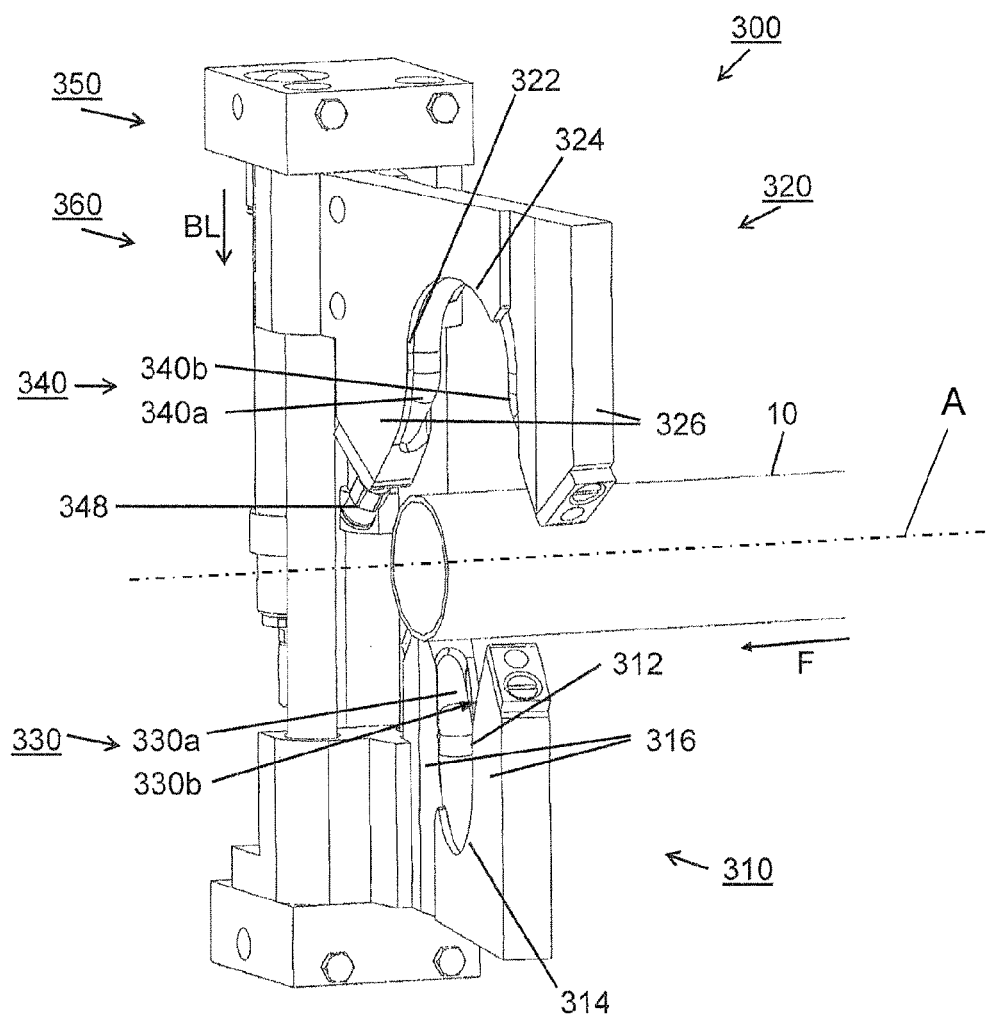
FIG. 6: is a schematic and perspective view to a third embodiment of the casing brake assembly according to the present invention, with the braking and sealing elements in the release position.

FIG. 6 is a schematic and perspective view to a third embodiment of a casing brake assembly 300 according to the present invention.

Casing brake assembly 300 according to FIG. 6 comprises a first or lower support element 310 and a second or upper support element 320 which are positioned diametrically below and above filling tube 10. Upper and lower support elements 310, 320 are formed by at least approximately vertically arranged plates which comprise approximately U-shaped cutouts 312, 322. Cutouts 312, 322 are directed or face towards filling tube 10. Support elements 310, 320 include an approximately semicircular bottom portion 314, 324 and leg portions 316, 326.

Casing brake assembly 300 comprises a brake body B including a first braking and sealing element 330 and a second braking and sealing element 340. First braking and sealing element 330 is mounted to cutout 314 of lower support element 310, and second braking and sealing element 340 is mounted to cutout 324 of upper support element 320.

Similar to casing brake assembly 100 of FIGS. 2 and 3, casing brake assembly 300 of FIG. 6 also comprises guide means 350 as well as drive means 360 for reversibly vertically guiding and driving lower and upper support elements 310, 320 towards filling tube 10 between the release position and the brake position in brake direction BL.

As it can be seen in FIG. 6, grooves extend in the surfaces of U-shaped cutouts 312, 322 in support elements 310, 320. Braking and sealing elements 330, 340 have a circular cross-section and are arranged in said grooves. Braking and sealing elements 330, 340 extend in the grooves in radial direction towards filling tube 10 in a plane approximately vertically to longitudinal axis A of filling tube 10. Braking and sealing elements 330, 340 may be formed by a solid band having a circular cross-section. In the embodiment of FIG. 6, braking and sealing elements 330, 340 have a tubular construction and thus, braking and sealing elements 330, 340 are inflatable. In FIG. 6, at the left end or free end 340*a* of upper braking and sealing element 340, which is fixed to the rear most leg portion 326 of upper support elements 320, a connector 348 is shown for connecting braking and sealing element 340 to a pressure fluid source, like a pneumatic or hydraulic fluid source. The second free end 340*b* of braking and sealing element 340 is fixed to the front most leg portion 326 of support element 320. Lower braking and sealing element 230 comprises a similar connector 238 at its free end 330*a*. Free end 330*b* is fixed to front most leg portion 316 of lower support element 310.

The size and the material of braking and sealing elements 330, 340 are selected to allow an adaption to the packaging casing material M to be filled and/or the diameter of the packaging casing material M and the filling tube. Moreover, by adjusting the degree of inflation of braking and sealing elements 330, 340, also the value of the frictional force or brake force acting on tubular packaging casing material M may be adjusted. For adjusting the degree of inflation of braking and sealing elements 330, 340, a control unit (not shown) is coupled to the pressure fluid source.

Support elements 210, 220 of casing brake assembly 200 according to FIGS. 4 and 5 are aligned parallel to each other and also parallel to a plane vertically aligned to longitudinal axis A of filling tube 10.

Contrary thereto, as shown in FIG. 6, vertically arranged support elements 310, 320 of casing brake assembly 300 are aligned in angles to a plane vertically to longitudinal axis A of filling tube 10. The angles between support elements 310, 320 and said plane vertically aligned to longitudinal axis A of filling tube 10 are of identical size, but of contrary prefixes. That means, lower support element 310 is pivoted about a vertical axis, e.g. the axis of guide post of guide device 350, in feeding direction F, whereas upper support element 320 is pivoted about a vertical axis, e.g. of the respective other guide post, in the counter direction of feeding direction F.

The guide posts are arranged parallel and with an axial distance to each other in feeding direction F. The angles between support elements 310, 320 and the plane vertically aligned to longitudinal axis A of filling tube 10 and the distance between the guide posts in feeding direction F are coordinated in a manner that 30 the center point of semicircular bottom portion 324 of U-shaped cutout 322 in upper support element 320 is vertically aligned above the center point of semicircular bottom portion 314 of U-shaped cutout 312 in lower support element 310. When moved into the brake position, the front most leg portions 316, 326 as well as the rear most leg portions 316, 326 of support elements 310, 320 pass each other, but on different sides, as explained in more detail in conjunction with a further embodiment of a casing brake assembly according to FIG. 9. Accordingly, when moved into the brake position, also free ends 330*a*, 330*b* and 340*a*, 340*b* of lower and upper braking and sealing elements 330, 340 pass each other, but on different sides. That means that support elements 310, 320, and braking and sealing elements 330, 340 are arranged crosswise, when seen from above in brake direction BL. For forming a closed ring structure, in the brake position, free ends 330*a*, 330*b* of lower braking and sealing element 330 and free ends 340*a*, 340*b* of upper braking and sealing element 340 are in a lateral contact.

Figure 7:
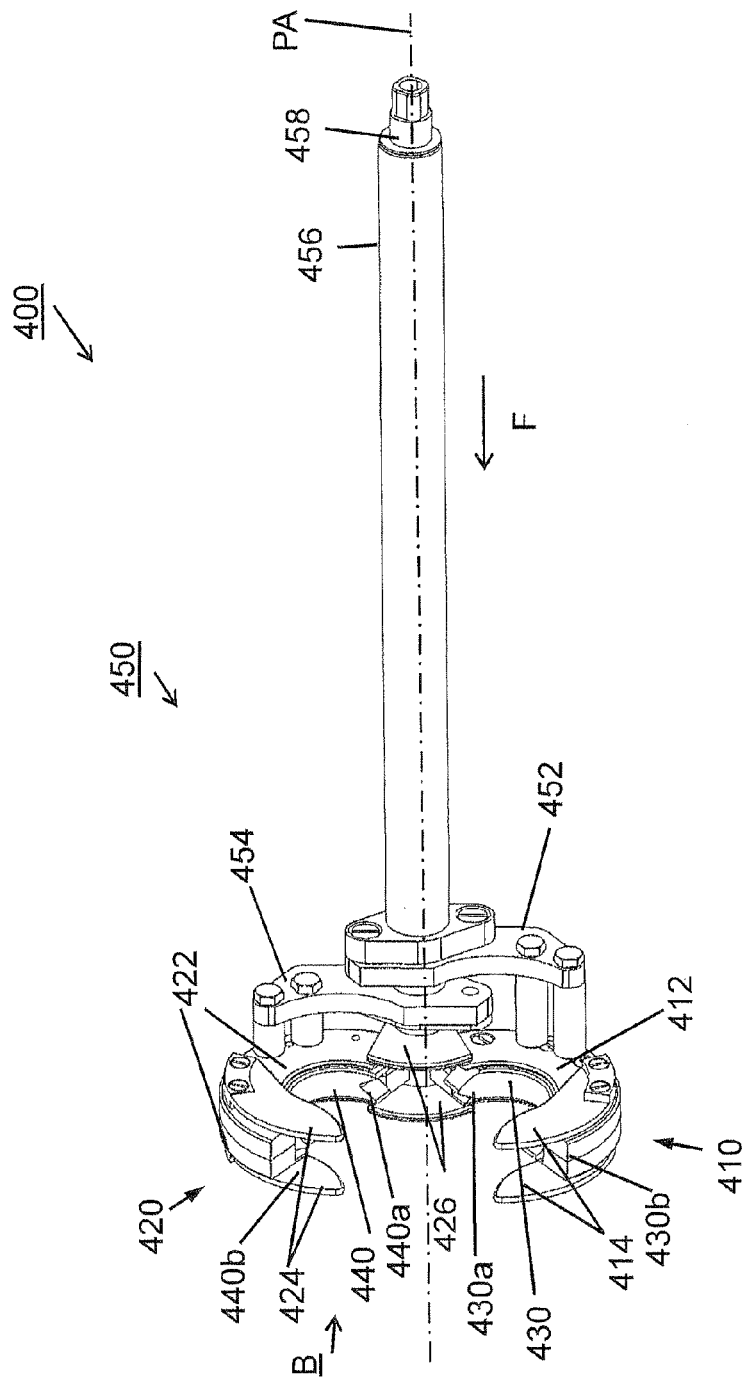
FIG. 7: is a schematic and perspective view to a fourth embodiment of the casing brake assembly according to the present invention, with the braking and sealing body in the release position.

FIG. 7 is a schematic and perspective view to a fourth embodiment of the casing brake assembly 400 according to the present invention.

Casing brake assembly 400 according to FIG. 7 comprises a first or lower support element 410 and a second or upper support element 420. Support elements 410, 420 are in the form of approximately semicircular ring segments which are operatively coupled to a pivot drive means 450 including a lower pivot lever 452, an upper pivot lever 454, a first pivot axle 456 coupled to lower pivot lever 452, and a second pivot axle 458 coupled to upper pivot lever 454. First or outer pivot axle 446 is a hollow axle, in which second pivot axle 458 is coaxially and pivotally accommodated. Thereby, axles 456, 458 are coaxially aligned to a common pivot axis PA. As shown in FIG. 7, the left end of second axle 458 exceeds hollow axle 456 for coupling pivot lever 454 thereto. Lower pivot lever 452 is coupled to the left end of hollow axle 456. Also the right end of second axle 458 exceeds the right end of hollow axle 456 for coupling a respective drive (not shown) to the right ends of axles 456 and 458, respectively.

Figure 8:
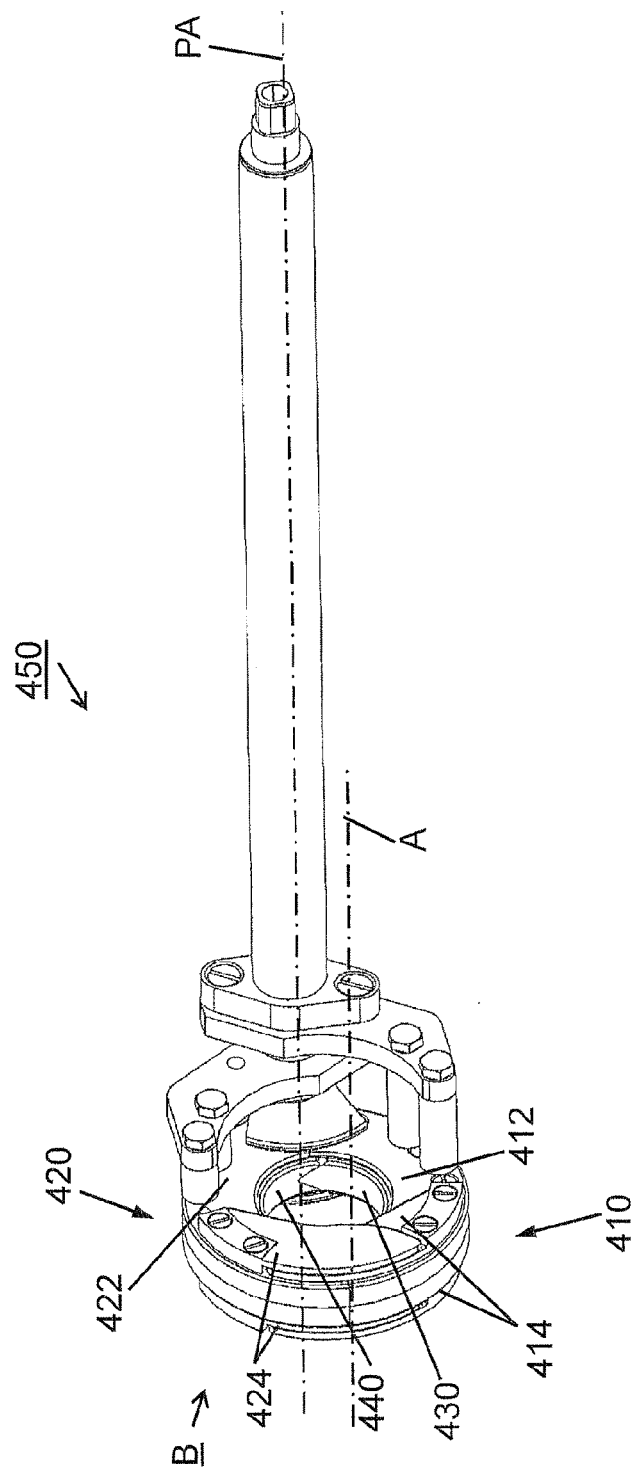
FIG. 8: is a schematic and perspective view to the casing brake assembly of FIG. 7, with the braking and sealing body in the brake position.

As shown in FIG. 7, lower support element 410 is mounted to lower pivot lever 452, and upper support element 420 is mounted to upper pivot lever 454, for being reversibly pivotal between the release position shown in FIG. 7, and a brake position shown in FIG. 8, by a pivot drive assembly 450. Lower and upper support elements 410, 420 have the form of at least approximately semicircular ring segments and arranged to each other in a manner that, when pivoted into the brake position, lower and upper support elements 410, 420 form a closed ring. That means the rear most ends of lower and upper support elements 410, 420, according to FIG. 7, are positioned closed to each other and also closed to pivot axis PA.

Casing brake assembly 400 according to FIG. 7 further comprises a braking and sealing body B including a lower braking and sealing element 430 and an upper braking and sealing element 440, which have the form of semicircular ring segments. Lower and upper braking and sealing elements 430, 440 are coupled to the inner surfaces of lower and upper support elements 410, 420 and secured in axially direction or feeding direction F by a pair of lowers semicircular covering plates 412 and a pair of upper semicircular covering plates 422, respectively, which are mounted to lower and upper support elements 410, 420. The outer diameter of braking and sealing elements 430, 440 coincides with the inner diameter of support elements 410, 420.

The inner surfaces of lower and upper braking and sealing elements 430, 440 are at least approximately planar in feeding direction F, which means that, in the brake position, the inner surfaces of lower and upper braking and sealing elements 430, 440 form a closed cylinder which has a diameter that is slightly larger than the outer diameter of the filling tube 10. In order to apply a frictional force to the tubular packaging casing material M pulled-off from filling tube 10, lower and upper braking and sealing elements 430, 440 are inflatable. For inflating lower and upper braking and sealing elements 430, 440, respective connectors (not visible in FIG. 7) for connecting lower and upper braking and sealing elements 430, 440 to a pressure fluid source are provided on the outer surfaces of lower and upper support elements 410, 420 in the region of the rearmost ends of lower and upper support elements 410, 420. As it further can be seen in FIG. 7, lower and upper braking and sealing elements 430, 440 have free ends 430a, 430b and 440a, 440b.

As it further can be seen in FIG. 7, pairs of lower and upper guide plates 414, 424 and a pair of rear guide plates 426 are provided in the region of the front most free ends 430a, 440a and the rear most ends 430b, 440b of semicircular lower and upper braking and sealing elements 430, 440, for preventing tubular packaging casing material M from being clamped between the end surfaces of support elements 310, 320 or braking and sealing elements 330, 340, respectively. Moreover, for further preventing tubular packaging casing material M from being clamped between the end surfaces of free ends 430a, 430b and 440a, 440b of braking and sealing elements 430, 440, said end surfaces of free ends 430a, 430b and 440a, 440b of lower and upper braking and sealing elements 430, 440 may have different, but complementary shapes. According to FIG. 7, the end surfaces of lower braking and sealing element 430 is triangular with a peak directed towards upper braking and sealing element 440, and the end surfaces of upper braking and sealing element 440 comprise a V-shaped cutout matching the triangular shape of the end surfaces of lower braking and sealing element 430. Alternatively, instead of a V-shape, one of the end surfaces may form a wave or a plane sloping in feeding direction F or in a plane parallel thereto, whereas the respective other end surface has a matching counter-shape.

FIG. 8 is a schematic and perspective view to casing brake assembly 400 of FIG. 7, with braking and sealing elements 430, 440 of braking and sealing body B in the brake position. As it can be seen in FIG. 7, support elements 410, 420 and braking and sealing elements 430, 440 form a closed ring which surrounds filling tube 10 (not shown) coaxially to longitudinal axis A of filling tube 10. Covering plates 414, 424, 426 cover free ends 430a, 430b and 440a, 440b of semicircular lower and upper braking and sealing elements 430, 440 and the ends of lower and upper support elements 410, 420, respectively.

Figure 9:
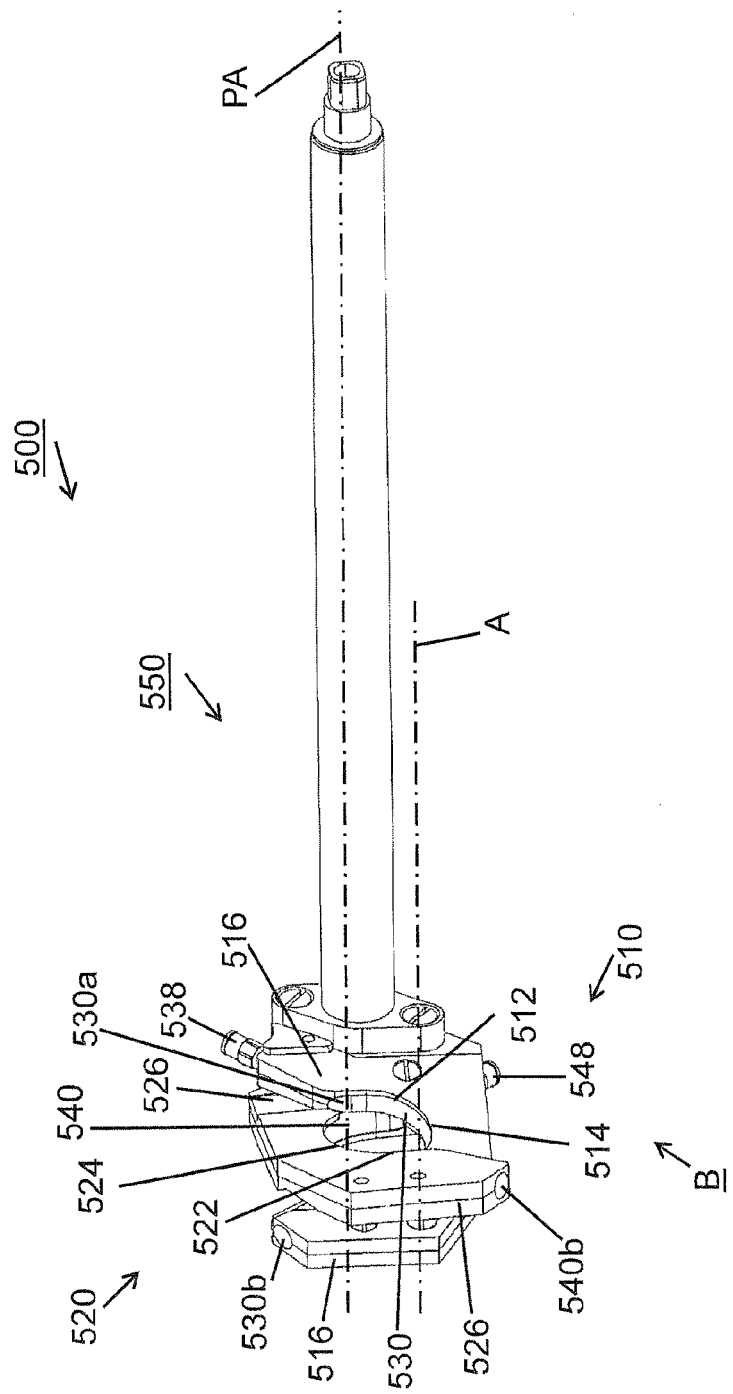
FIG. 9: is a schematic and perspective view to a fifth embodiment of the casing brake assembly according to the present invention, with the braking and sealing body in the brake position.

FIG. 9 is a schematic and perspective view to a fifth embodiment of the casing brake assembly 500 according to the present invention.

Casing brake assembly according 500 according to FIG. 9 comprises a first or lower support element 510 and a second or upper support element 520 which are positioned diametrically below and above filling tube 10 (not shown) coaxially to its longitudinal axis A. Lower support element 510 and upper support element 520, in FIG. 9, are in the brake position.

Similar to casing brake assembly 300 shown in FIG. 6, lower and upper support elements 510, 520 of casing brake assembly 500 are formed by at least approximately vertically arranged plates which comprise approximately U-shaped cutouts 512, 522. Cutouts 512, 522 are directed towards filling tube 10. Support elements 510, 520 include an approximately semicircular bottom portion 514, 524 and leg portions 516, 526.

Casing brake assembly 500 comprises a brake body B including a first braking and sealing element 530 and a second braking and sealing element 540. First braking and sealing element 530 is mounted to cutout 512 of lower support element 510, and second braking and sealing element 540 is mounted to cutout 522 upper support element 520.

Also similar to the casing brake assembly 300 of FIG. 6, braking and sealing elements 530, 540 have a tubular construction and thus, braking and sealing elements 530, 540 are inflatable. In FIG. 9, at the left end or free end 530a of lower braking and sealing element 530, which is fixed to the rear most leg portion 516 of lower support elements 510, a connector 538 is shown for connecting braking and sealing element 530 to a pressure fluid source, like a pneumatic or hydraulic fluid source. The second free end 530b of braking and sealing element 530 is fixed to the front most leg portion 516 of support element 510. Upper braking and sealing element 540 comprises a similar connector 548 at its free end 540a (not visible in FIG. 9). Free end 540b is fixed to front most leg portion 526 of upper support element 520, accordingly.

Vertically arranged support elements 510, 520 of casing brake assembly 500 are aligned in angles to a plane vertically to longitudinal axis A of filling tube 10, as already disclosed in conjunction with support elements 310, 320 of casing brake assembly 300 according to FIG. 6. The angles between support elements 510, 520 and said plane vertically aligned to longitudinal axis A of filling tube 10 are of identical size, but of contrary prefixes. That means, lower support element 510 is pivoted about a vertical axis, e.g. the axis of guide post of guide device 550, in feeding direction F, whereas upper support element 520 is pivoted about a vertical axis, e.g. of the respective other guide post, in the counter direction of feeding direction F. Thus, when moved into the brake position, front most leg portions 516, 526 as well as rear most leg portions 516, 526 of support elements 510, 520 pass each other, but on different sides, as it can be seen in FIG. 9.

For reversibly moving lower and upper support elements 510, 520 between the release position and the brake position, lower and upper support elements 510, 520 are coupled to a pivot drive assembly 550 which is constructed similar to pivot drive assembly 450 explained in detail in conjunction with casing brake assembly 400 of FIGS. 7 and 8.

Figure 9B:
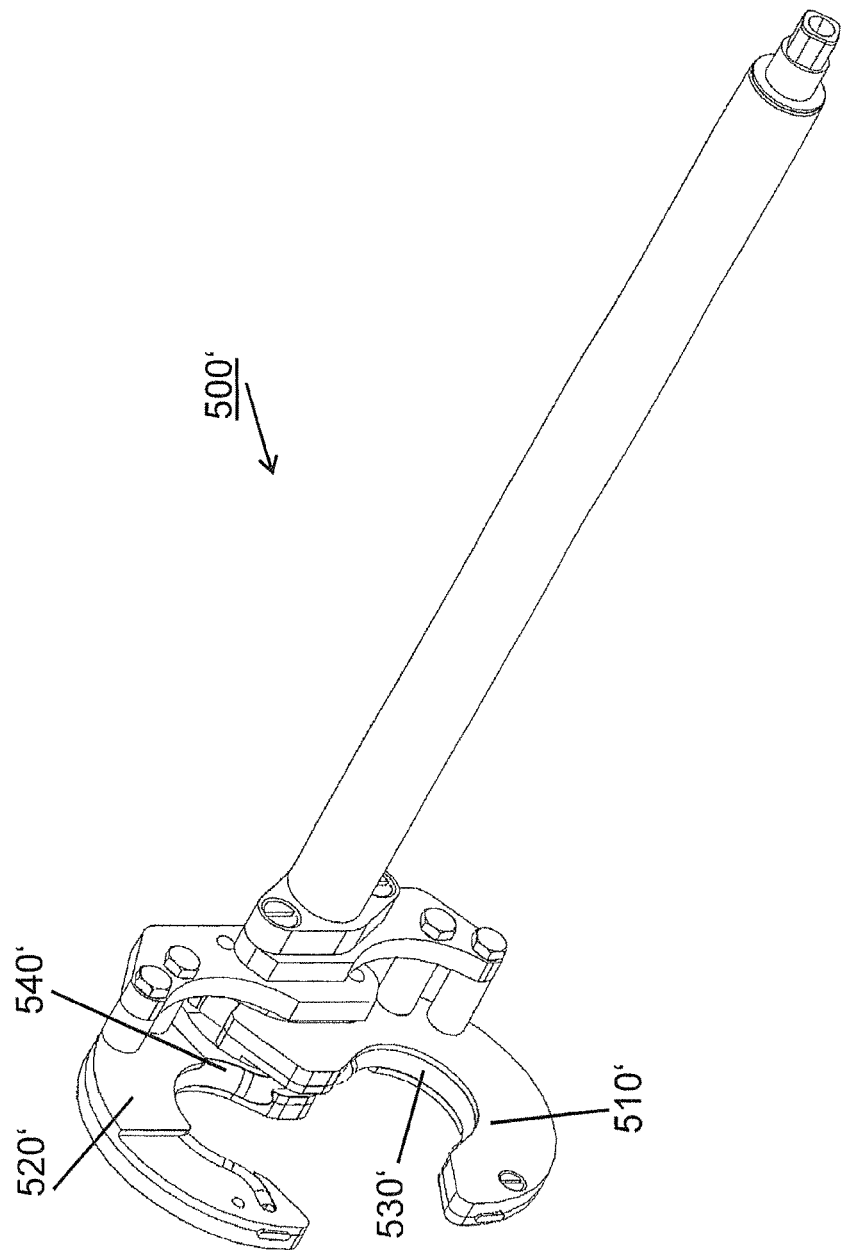
FIG. 9b: is a schematic and perspective view of the further embodiment of the casing brake assembly of FIG. 9a with the braking body in the release position.

In FIGS. 9a and 9b, a further version of the embodiment shown in FIG. 9 is disclosed. This further embodiment is similar to said already described in conjunction with FIG. 9 whereas the support elements 510', 520' as well as braking and sealing elements 530', 540' do not cross each other, but lies side by side.

Figure 10:
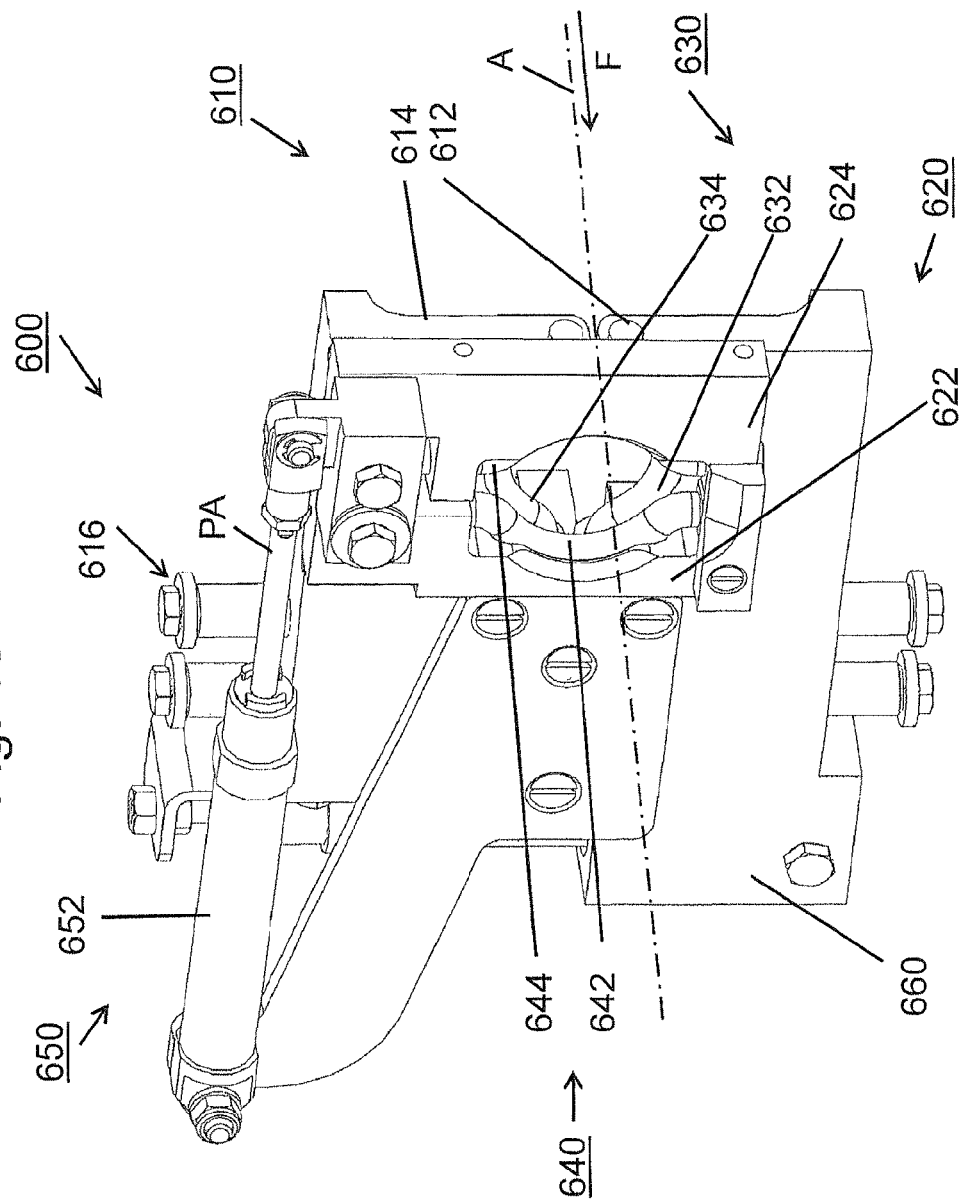
FIG. 10: is a schematic and perspective view to a sixth embodiment of the casing brake assembly according to the present invention, with the braking and sealing body in the brake position.

FIG. 10 is a schematic and perspective view to a sixth embodiment of the casing brake assembly 600 according to the present invention, with its braking and sealing elements 630, 640 in the brake position.

Casing brake assembly 600 according to FIG. 10 comprises two pairs of support elements 610, 620. First pair of support elements 610 comprises a lower support component 612 and an upper support component 614, which are linearly vertically movable towards longitudinal axis A of filling tube 10 (not shown) by a linear drive assembly 616. Lower and upper support components 612, 614 and linear drive assembly 616 are of a construction similar to that of casing brake assemblies 100 to 300, shown in FIGS. 2 to 6.

Second pair of support elements 620 comprises a rear support component 622 and a front support component 624, arranged parallel and in closed vicinity to first pair of support elements 610. Rear support component 622 is at least approximately vertically arranged and fixedly mounted to a frame element 660 of casing brake assembly 600. Front support component 624 is also approximately vertically arranged in a common plane with rear support component 622. Front support component 624 is pivotally mounted by its upper end to frame element 660. A drive assembly 650 including a piston/cylinder drive 652 is mounted to frame element 640 and coupled to front support component 624 for reversibly pivoting front support component 624 between the brake position (shown in FIG. 10) and the release position, in which front support component 624 is pivoted about pivot axis PA into an approximately horizontal position.

Casing brake assembly 600 comprises a braking and sealing body B which includes two pairs of braking and sealing elements 630, 640. First pair of braking and sealing elements 630 comprises a lower braking and sealing element 632 and an upper braking and sealing element 634, which are mounted to approximately C-shaped cutouts in lower and upper support components 612, 614 of first pair of support elements 610. First pair of braking and sealing elements 640 comprises a rear braking and sealing element 642 and a front braking and sealing element 644, which are mounted to approximately C-shaped cutouts in rear and front support components 622, 624.

Braking and sealing elements 632, 634, 642, 644 facing towards longitudinal axis A of filling tube 10 and in a manner that braking and sealing elements 632, 634; 642, 644 of each pair of braking and sealing elements 630, 640 are arranged diametrically to longitudinal axis A of filling tube 10. When shifted into the brake position, braking and sealing elements 632, 634, 642, 644 completely surrounding filling tube 10.

Braking and sealing elements 632, 634, 642, 644 of FIG. 10 are of a tubular inflatable construction as disclosed in conjunction with casing brake assemblies 300 or 500 above. Alternatively, braking and sealing elements 632, 634, 642, 644 may also have any other suitable form, e.g. they may formed by solid strings having a circular diameter, or may include resilient brake lips.

Figure 11:
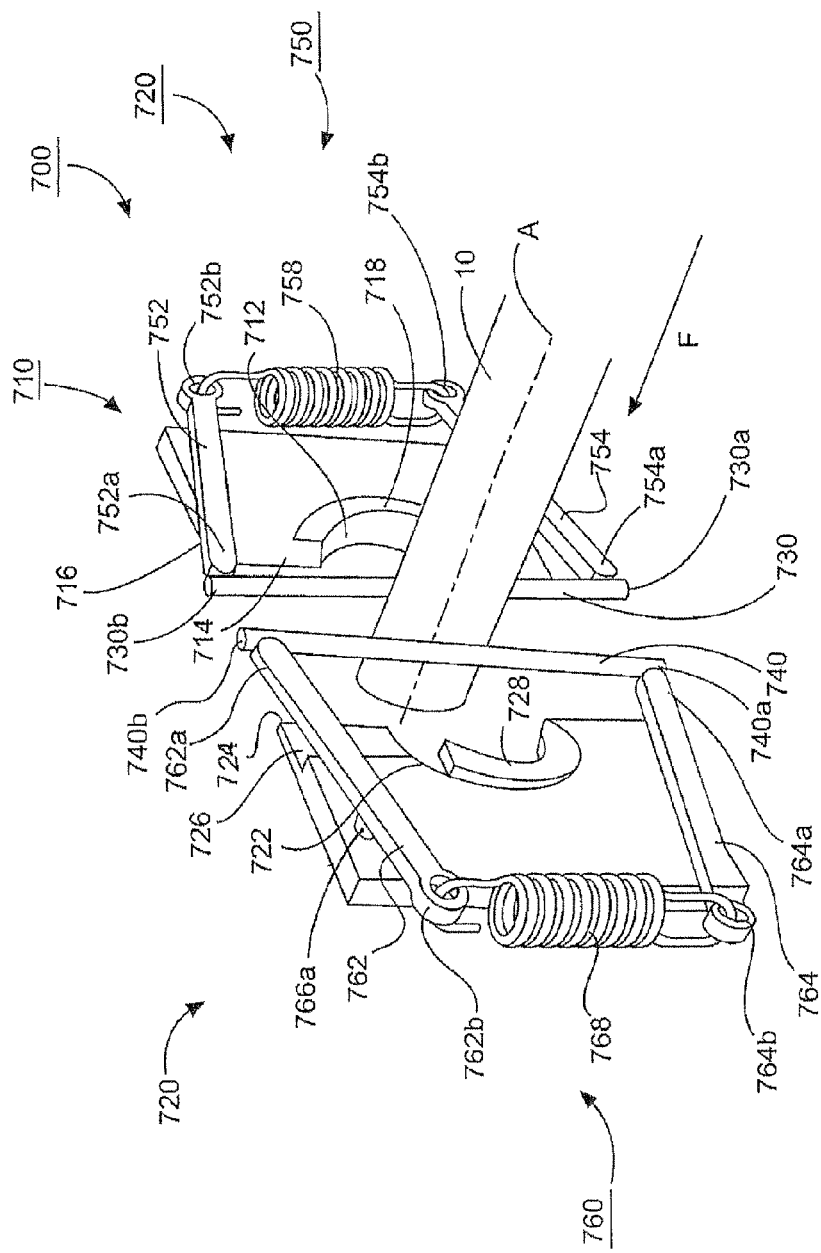
FIG. 11: is a schematic and perspective view to a seventh embodiment of the casing brake assembly according to the present invention, with the braking and sealing body in the release position.

FIG. 11 is a schematic and perspective view to a sixth embodiment of the casing brake assembly 700 according to the present invention.

Casing brake assembly 700 according to FIG. 11 comprises a rear support element 710 and a front support element 720, which are of a plate like structure. Support elements 710, 7120 are arranged parallel to each other and in a common plane vertically to longitudinal axis A of filling tube 10.

Figure 12:
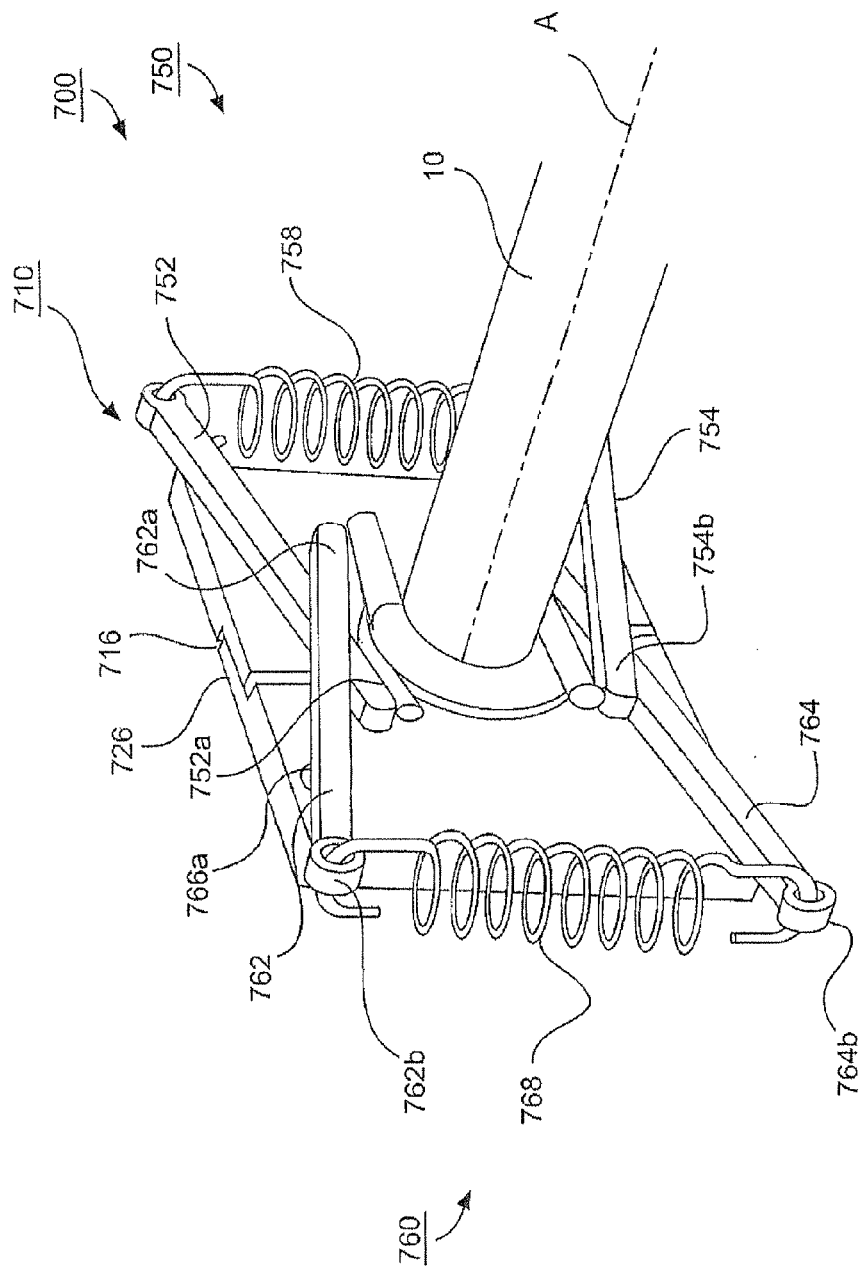
FIG. 12: is a schematic and perspective view to the casing brake assembly of FIG. 11, with the braking and sealing body in the brake position.

Each support element 710, 720 comprises a C-shaped, approximately semicircular cutout 712, 722, which are directed towards each other and also towards filling tube 10. In the surfaces 714, 724 of support elements 710, 720, which face to each other, support element 710 has a vertically arranged rectangular cutout 716 at the vertical edge of support element 710 facing in feeding direction F. Support element 720 has a respective cutout 726 along the vertical edge of support element 720, facing in the counter direction of feeding direction F. Cutouts 716, 726 are sized such that they match with each other when support elements 710, 720 are shifted into the brake position, as shown in FIG. 12.

Support elements 710, 720 further comprise approximately semicircular abutment elements 718, 728 which have the shape of an approximately semicircular ring segment, which match with C-shaped cutout 712, 722 of support elements 710, 720, in which abutment elements 718, 728 fixed.

A braking and sealing body B includes a rear braking and sealing element 730 having a lower end 730a and an upper end 730b, and a front braking and sealing element 740 having a lower end 740a and an upper end 740b. Braking and sealing elements 730, 740, in the release as shown in FIG. 10, are linearly and arranged approximately vertically between filling tube 10 and rear support element 710 and front support element 720, respectively.

Rear braking and sealing element 730 is coupled to the front end 752a of an approximately horizontally arranged upper rear lever 752 of a rear lever assembly 750, by its upper end 730b. Lower end 730a of rear braking and sealing element 730 is mounted to the front end 754a of a lower lever 754 of rear lever assembly 750. A spring element 758 is fixed between rear ends 752b, 754b of upper and lower levers 752, 754 of rear lever assembly 750, in order to apply a tension to rear braking and sealing element 730 via upper and lower rear levers 752, 754.

Accordingly, front braking and sealing element 740 is coupled to the rear end 762a of an approximately horizontally arranged upper front lever 762 of a front lever assembly 760, by its upper end 740b. Lower end 740a of rear braking and sealing element 740 is mounted to the rear end 764a of a lower lever 764 of front lever assembly 760. A spring element 768 is arranged between front ends 762b, 764b of upper and lower levers 762, 764 of front lever assembly 760, in order to apply a tension to front braking and sealing element 740 via upper and lower rear levers 762, 764.

Levers 752, 754, 762, 764 of front and rear lever assemblies 750, 760 are arranged parallel to rear and front support elements 710, 720 and horizontally above and below filling tube 10, respectively. Rear levers 752, 754 are coupled to rear support element 710 by respective upper and lower pivot points 756a, 756b (not visible in FIG. 11). Front levers 762, 764 are coupled to front support element 720 by respective upper and lower pivot points 766a, 766b, from which only upper pivot point 766a is visible in FIG. 11.

Upper rear lever 752 and lower front lever 764 are positioned in closed vicinity to support elements 710, 720 at the side surface facing in the counter direction to feeding direction F, according to FIG. 11, to the right. Lower rear lever 754 and upper front lever 762 are arranged with a distance to the right side surfaces of rear and front support elements 710, 720, in the counter direction of feeding direction R. The distance between lower rear lever 754 and upper front lever 762 and the right side surfaces of rear and front support elements 710, 720 corresponds to the width of upper rear lever 752 and lower front lever 764. Accordingly, rear and front braking and sealing elements 730, 740 are not exactly arranged parallel to each other. Lower ends 730a, 740a of rear and front braking and sealing elements 730, 740 are aligned with a distance to each other in feeding direction F with respect to a plane vertically aligned to longitudinal axis A of filling tube 10. Upper ends 730b, 740b are aligned to each other accordingly, but in the counter direction. Rear and front braking and sealing elements 730, 740 are thereby aligned crosswise, with their center points being arranged diametrically relative to longitudinal axis A of filling tube 10. This enables lower and upper ends 730a, 740a, 730b, 740b of rear and front braking and sealing elements 730, 740 to pass each other when shifted into the brake position, as shown in FIG. 11.

FIG. 12 is a schematic and perspective view to the casing brake assembly 700 of FIG. 11, with the braking and sealing elements 730, 740 in the brake position.

In the brake position, rear and front support elements 710, 720 are shifted towards filling tube 10. Rectangular cutout 716 at the vertical edge of support element 710 and rectangular cutout 726 of support element 720 engage each other. Semicircular abutment elements 718, 728 mounted in C-shaped cutout 712, 722 of support elements 710, 720, abut against each other by their end, thereby forming a closed ring structure having an inner diameter being slightly larger than the outer diameter of filling tube 10, for enabling tubular packaging casing material M passing therethrough.

As it further can be seen in FIG. 12, in the brake position, rear and front braking and sealing elements 730, 740 completely surround filling tube 10. Rear braking and sealing element 730 is wound around the rear half of filling tube 10, whereas front braking and sealing element 740 is wound around the front half of filling tube 10. During movement into the brake position, front end 752a of upper rear lever 752 has engaged into the space between front support element 720 and upper front lever 762, and rear end 764a of lower front lever 764 has engaged into the space between rear support element 710 and lower rear lever 754. Rear and front braking and sealing elements 730, 740 of braking and sealing body B thereby forming a closed ring around the tubular packaging casing material M (not shown) on filling tube 10. Levers 752, 754, 762, 764 are pivoted about their pivot points 756a, 756b, 766a, 766b. Spring elements 758, 768 are stretched in vertical direction, thereby applying a respective tension to rear and front braking and sealing elements 730, 740.

In order to adjust the tension to rear and front braking and sealing elements 730, 740, and thus the braking and/or sealing force acting on tubular casing material M, respective spring elements may be selected. Alternatively or additionally, braking and sealing elements 730, 740 may be replaced by braking and sealing elements having selected tension characteristics, e.g. depending on the material of the braking and sealing elements.

In conjunction with casing brake assembly 700, no specific drive assembly has been described for reversibly driving support elements 710, 720 between the release position and the brake position. Any suitable drive may be selected to move support elements 710, 720 in the plane approximately vertically aligned to longitudinal axis A of filling tube 10, like one of the linear or pivot drive assemblies described above.

Moreover, casing brake assembly 700 may also aligned in vertical direction, that means that it may be rotated about longitudinal axis A of filling tube 10 such that support elements 710, 720 are to be moved vertically.

It has to be noted that other than the above described drive means or support means for driving or supporting the one or more braking and sealing elements may be provided. Also other than the above described braking and sealing elements may be used in conjunction with the present invention.

What is claimed is:

1. A casing brake assembly for applying a frictional force to a tubular or bag-shaped packaging casing being arranged on a filling tube of an apparatus for filling and closing said tubular or bag-shaped packaging casing, like a clipping machine, for limiting the movement of said tubular or bag-shaped packaging casing at least while being filled,
wherein the filling tube has a longitudinal axis;
wherein the casing brake assembly comprises at least one braking and sealing body which is reversibly movable between a release position, in which the braking and sealing body is at least partially moved away from the filling tube, and a brake position in which the braking and sealing body at least approximately completely surrounds the filling tube, and which comprises at least two free ends; and
wherein the casing brake assembly further comprises at least two support elements for supporting and reversibly moving the at least one braking and sealing body between the release position and the brake position in a plane at least approximately vertically to the longitudinal axis of the filling tube.

2. The casing brake assembly according to claim 1,
wherein the braking and sealing body is formed by a single braking and sealing element.

3. The casing brake assembly according to claim 2,
wherein the single braking and sealing element has two free ends which are adapted to be moved in two planes extending at least approximately parallel to each other and vertically to the longitudinal axis of the filling tube and which are adapted to overlap each other in a circumferential direction of the filling tube and to lie closely to each other in the brake position.

4. The casing brake assembly according to claim 1,
wherein the braking and sealing body is formed by a single braking and sealing element; or wherein the braking body is formed by two or more braking and sealing elements.

5. The casing brake assembly according to claim 4,
wherein the single braking and sealing element or at least one of the two or more braking and sealing elements are replacably mounted to the support elements.

6. The casing brake assembly according to claim 5,
wherein the single braking and sealing element has a brake surface.

7. The casing brake assembly according to claim 6,
wherein the single braking and sealing element or at least one of the two or more brake surfaces of the braking and sealing elements comprise a resilient brake lip.

8. The casing brake assembly according to claim 4,
wherein the single braking and sealing element or at least one of the two or more braking and sealing elements have a brake surface.

9. The casing brake assembly according to claim 8,
wherein the single braking and sealing element or at least one of the two or more brake surfaces of the braking and sealing elements comprise a resilient brake lip.

10. The casing brake assembly according to claim 4,
wherein the single braking and sealing element or at least one of the two or more braking and sealing elements are formed by string-shaped resilient elements.

11. The casing brake assembly according to claim 4,
wherein the single braking and sealing element or at least one of the two or more braking and sealing elements are of an at least partially approximately tubular inflatable construction.

12. The casing brake assembly according to claim 11,
wherein the brake force of the single braking and sealing element or at least one of the two or more braking and sealing elements, acting on the tubular or bag-shaped packaging casing, is adjustable by the degree of inflation of the braking and sealing elements.

13. The casing brake assembly according to claim 4,
wherein the support elements are pivotably arranged levers, for reversibly pivoting the braking and sealing elements towards the filling tube.

14. The casing brake assembly according to claim 4,
wherein the support elements are linearly drivable, for reversibly, moving the braking and sealing elements in a linear direction towards the filling tube.

15. The casing brake assembly according to claim 4,
wherein two or more braking and sealing elements are aligned to each other in a manner to be diametrically arranged around the filling tube, at least in their brake position.

16. The casing brake assembly according to claim 4,
wherein more than two braking and sealing elements are provided.

17. The casing brake assembly of claim 16,
wherein the more than two braking and sealing elements are arranged in regular intervals around the filling tube when in their brake position.

18. The casing brake assembly according to claim 1,
wherein a control unit is adapted for controlling drives of the at least two support elements.

19. The casing brake assembly of claim 18,
wherein the more than two braking and sealing elements are arranged in regular intervals around the filling tube when in their brake position.

* * * * *